(12) United States Patent
Gaiser et al.

(10) Patent No.: US 11,002,169 B2
(45) Date of Patent: May 11, 2021

(54) PROCESS FOR MANUFACTURING AN EXHAUST SYSTEM AND EXHAUST SYSTEM

(71) Applicant: Eberspächer Exhaust Technology GmbH & Co. KG, Neunkirchen (DE)

(72) Inventors: Gerd Gaiser, Reutlingen (DE); Bernd Weller, Durlangen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 52 days.

(21) Appl. No.: 16/140,772

(22) Filed: Sep. 25, 2018

(65) Prior Publication Data

US 2019/0101036 A1 Apr. 4, 2019

(30) Foreign Application Priority Data

Sep. 29, 2017 (DE) ...................... 10 2017 122 696.6

(51) Int. Cl.
*F01N 3/20* (2006.01)
*F01N 3/28* (2006.01)
*C23C 4/11* (2016.01)
*C23C 4/18* (2006.01)
*B01J 37/02* (2006.01)
(Continued)

(52) U.S. Cl.
CPC .......... *F01N 3/2066* (2013.01); *B01J 21/063* (2013.01); *B01J 37/0244* (2013.01); *C23C 4/11* (2016.01); *C23C 4/18* (2013.01); *F01N 3/281* (2013.01); *F01N 3/2892* (2013.01); *B01D 53/9431* (2013.01); *F01N 2370/00* (2013.01); *F01N 2510/06* (2013.01); *F01N 2610/02* (2013.01)

(58) Field of Classification Search
CPC ...... F01N 3/2066; F01N 3/281; F01N 3/2892; F01N 13/0093; F01N 2370/00; F01N 2510/06; F01N 2610/02; B01J 19/24; B01J 21/04; B01J 21/063; B01J 21/066; B01J 23/002; B01J 37/0219; B01J 37/0244; B01D 53/90; B01D 53/9431; B01D 2258/012; C23C 4/11; C23C 4/18; C23C 48/042
See application file for complete search history.

(56) References Cited

U.S. PATENT DOCUMENTS 5,721,188 A 2/1998 Sung et al.
2005/0261127 A1* 11/2005 Noda ....................... B01J 23/58
502/350
(Continued)

FOREIGN PATENT DOCUMENTS

DE 40 38 054 A1 6/1992
DE 197 31 865 A1 2/1999
(Continued)

*Primary Examiner* — Audrey K Bradley
(74) *Attorney, Agent, or Firm* — McGlew and Tuttle, P.C.

(57) ABSTRACT

A process for manufacturing an exhaust system for an internal combustion engine includes the steps: a) providing at least one exhaust gas-carrying component (12, 18) for the exhaust system (10); b) applying a basic material layer (24, 26) to at least one area of a surface of at least one of the exhaust gas-carrying components (12, 16) in a high-temperature application process; and c) applying a catalytically active material layer (28, 30) to the basic material layer (24, 26) in a low-temperature application process.

14 Claims, 1 Drawing Sheet

(51) Int. Cl.
*B01D 53/94* (2006.01)
*B01J 21/06* (2006.01)

(56) References Cited

U.S. PATENT DOCUMENTS

| | | | |
|---|---|---|---|
| 2009/0185968 | A1 | 7/2009 | Galligan et al. |
| 2009/0211232 | A1* | 8/2009 | Huennekes ............ B01D 53/88 60/276 |
| 2012/0031085 | A1* | 2/2012 | Zhang ................ B01D 53/9468 60/299 |
| 2016/0074809 | A1 | 3/2016 | Goffe |
| 2018/0298804 | A1* | 10/2018 | Wang ...................... F02B 37/00 |
| 2019/0030498 | A1* | 1/2019 | Kariya .................. B01F 5/0057 |

FOREIGN PATENT DOCUMENTS

| | | |
|---|---|---|
| DE | 10 2010 026 890 A1 | 3/2011 |
| DE | 10 2014 104 748 A1 | 10/2014 |
| EP | 0 898 643 A1 | 3/1999 |
| EP | 0 898 643 B1 | 3/2001 |
| EP | 2 266 681 B1 | 12/2017 |
| JP | 63232850 A * | 9/1988 |

\* cited by examiner

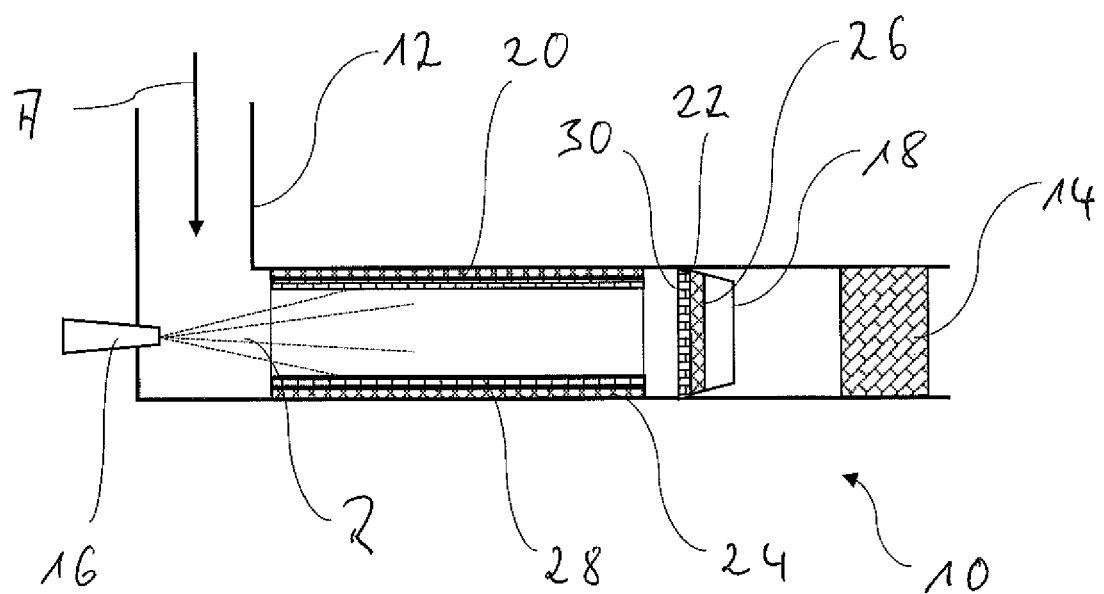

PROCESS FOR MANUFACTURING AN EXHAUST SYSTEM AND EXHAUST SYSTEM

CROSS REFERENCE TO RELATED APPLICATIONS

This application claims the benefit of priority under 35 U.S.C. § 119 of German Application 10 2017 122 696.6, filed Sep. 29, 2017, the entire contents of which are incorporated herein by reference.

TECHNICAL FIELD

The present invention pertains to a process for manufacturing an exhaust system for an internal combustion engine, for example, for a vehicle, as well as to an exhaust system manufactured, for example, according to such a process.

BACKGROUND

To reduce the pollutant emission of internal combustion engines, especially diesel internal combustion engines, which are used as drive units in vehicles, it is known that a reactant, generally a urea/water solution, is added to the exhaust gas stream, and that the percentage of nitrogen oxides in the exhaust gas is lowered in a selective catalytic reduction (SCR). The ammonia needed for carrying out a selective catalytic reduction in an SCR catalytic converter is provided by adding the reactant. Due to the contact with the hot exhaust gas or with the surface of exhaust gas-carrying components of an exhaust system, at least part of the water contained in the reactant injected into the exhaust gas stream, i.e., for example, a urea/water solution, evaporates first in the reactant Ammonia and isocyanic acid are formed from the urea during the thermal decomposition Ammonia is formed from the isocyanic acid and the previously evaporated water in a hydrolytic reaction carried out on a hydrolysis catalyst. Such a hydrolysis catalytic converter may be provided, for example, by coating a substrate formed generally from a ceramic material in a partial area of an SCR catalytic converter with a material that is catalytically active for hydrolysis, for example, titanium dioxide ($TiO_2$).

SUMMARY OF THE INVENTION

An object of the present invention is to provide a process for manufacturing an exhaust system and an exhaust system of an internal combustion engine, with which process and exhaust system improved treatment of the reactant injected into an exhaust gas stream is achieved especially for a selective catalytic reduction.

This object is accomplished according to the present invention by a process for manufacturing an exhaust system for an internal combustion engine, comprising the steps:

a) Provision of at least one exhaust gas-carrying component for the exhaust system, b) application of a basic material layer to at least one area of a surface of at least one of the exhaust gas-carrying components in a high-temperature application process, and c) application of a catalytically active material layer to the basis material layer in a low-temperature application process.

According to the present invention, a catalyst coating is applied as a multilayer coating, wherein one of the layers, applied as a basic material layer applied in a high-temperature application process, provides a very good adhesive effect and does not tend to separate from the surface of the coated component even under conditions involving thermal stress, especially also when the component to be coated does not consist of a ceramic material but is made of a metallic material. This is also true and especially true when a material that cannot basically exert any catalytic action itself is used as the material forming the basic material layer. The catalytically active material layer applied in a low-temperature application process shows very high catalytic activity, on the one hand, and does not tend, on the other hand, to separate from the coated component based on a bonding effect of the basic material layer.

Provisions may be made according to an especially advantageous aspect of providing a gas-carrying component consisting of a metallic material in step a), or/and for providing a pipe as an exhaust gas-carrying component in step a) or/and for providing a mixer as an exhaust gas-carrying component. This means that the hydrolysis to be carried out catalytically for the improved treatment of a urea/water solution used as a reactant can take place in an exhaust system manufactured according to the process according to the present invention independently from the configuration of an SCR catalytic converter already in an area located upstream of an SCR catalytic converter, so that the volume of an exhaust system, which volume is provided for an SCR catalytic converter, can be used exclusively for the selective catalytic reduction, and the ammonia necessary for this, which is generated from the reactant, is provided already upstream of the SCR catalytic converter in the area of the components that are present anyway, for example, in an exhaust gas-carrying pipe or/and in a mixer.

Ceramic material is preferably applied as the basic material layer in step b). Such material may be provided, for example, by applying titanium dioxide ($TiO_2$) or aluminum oxide ($Al_2O_3$) or zirconium oxide ($ZrO$ or $ZrO_2$) as the basic material layer in step b).

To make it possible to guarantee a sufficiently high temperature during the application of the basic material layer in step b), it is proposed that the basic material layer be applied in a flame spraying process or a plasma spraying process. An application temperature markedly exceeding 1,000° C. is reached in case of such a flame spraying application process or plasma spraying application process.

Ceramic material may be applied as the catalytically active material layer in step c). Provisions may be made for this, for example, for titanium dioxide or aluminum oxide or zirconium oxide to be applied as the catalytically active material layer in step c).

According to an especially advantageous aspect of the process according to the present invention, which is favorable for a stable bond between the basic material layer and the catalytically active material layer, provisions may be made for the basic material layer in step b) and the catalytically active material layer in step c) to be always applied using the same material. Based on the application of this the same material according to different processes, the two material layers develop basically different properties, which support a stable adhesive interaction with a material layer built up especially from a metallic material in the case of the basic material layer and facilitate the catalytic action in the case of the catalytically active material layer.

The catalytically active material layer may be applied in a dipping process or in a spraying process in step c). In such processes, the temperature of the material applied does not generally exceed values in the range of a few 100° C.

In step b), the temperature of the material to be applied for the basic material layer in the high-temperature application process is preferably at least 1,000° C. or/and preferably so high that the material to be applied is melted in at least some areas. Provisions may preferably be made in step c) for the temperature of the material to be applied for the catalytically active material layer in the low-temperature application process not to exceed 600° C. and preferably not to exceed 500° C.

To further improve the adhesive bond between the material forming the basic material layer and the component to be coated, it is proposed that step a) comprise a step a1) for degreasing a surface to be coated in step b) or/and for increasing the surface roughness of a surface to be coated in step b), preferably by sandblasting.

After carrying out step c), i.e., when the catalyst coating with the catalyst coating two material layers has been applied to at least one component, the at least one component coated with a basic material layer and with a catalytically active material layer may be fitted together with additional components of the exhaust system such that the at least one component coated with the basic material layer and with the catalytically active material layer is positioned downstream of a reactant release device and upstream of an SCR catalytic converter device.

According to another aspect, the object mentioned in the introduction is accomplished by an exhaust system for an internal combustion engine, preferably for a vehicle, comprising at least one exhaust gas-carrying component with a catalyst coating, wherein the catalyst coating comprises a basic material layer and a catalytically active material layer on the basic material layer. Such an exhaust system may be manufactured according to one of the above-described processes.

The basic material layer may be made of a ceramic material, preferably titanium dioxide, aluminum oxide or zirconium oxide, for a stable adhesive interaction with the component carrying same. The catalytically active material layer may be made of a ceramic material, preferably titanium dioxide, aluminum oxide or zirconium oxide. To support a stable bond between the two material layers, it is proposed that the basic material layer and the catalytically active material layer consist of the same material.

The different properties required for the two material layers may be provided, especially if the same material is used for these material layers, by the basic material layer and the catalytically active material layer having mutually different crystalline structures.

The present invention will be described in detail below with reference to the attached figure. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a schematic view showing an exhaust system or of a part of an exhaust system for an internal combustion engine of a vehicle.

DESCRIPTION OF PREFERRED EMBODIMENTS

Referring to the drawings, an exhaust system for an internal combustion engine of a vehicle is generally designated by 10 in FIG. 1. The exhaust system 10 shown in sections in FIG. 1 receives the exhaust gas A discharged by an internal combustion engine and sends the exhaust gas A, for example, in the direction of one or more mufflers, which are not shown in FIG. 1. The exhaust system 10 comprises as an exhaust gas-carrying component a pipe 12, which is made, in general, of a metallic material, e.g., steel plate, and which may also comprise, for example, a plurality of assembled pipe sections.

The exhaust system 10 further comprises an SCR catalytic converter device 14 to reduce the percentage of nitrogen oxides contained in the exhaust gas A. A reactant release device 16, generally also called an injector, through which a reactant R is injected in the form of a spray cone into the exhaust gas A flowing in the pipe 12, is arranged upstream in relation to the SCR catalytic converter device 14. The reactant R injected through the reactant release device 16 is, in general, a urea/water solution.

To bring about a better mixing of the exhaust gas A with the reactant R, a mixer, generally designated by 18, is provided downstream in the flow direction in relation to the reactant release device 16 and upstream in relation to the SCR catalytic converter device 14. The mixer 18 may have a plurality of blades or deflection surfaces deflecting the exhaust gas stream in order thus to bring about a swirling and, due to this swirling a better mixing of the exhaust gas A with the reactant R.

The reactant R, i.e., the urea/water solution, released by the reactant release device, is likewise heated during the injection into the pipe 12 by the contact with the exhaust gas A as well as by the pipe 12 heated by the exhaust gas stream or by the mixer 18, so that most of the water contained in the urea/water solution evaporates. Based on the heating, the urea undergoes thermal decomposition, while isocyanic acid and ammonia are essentially formed. The ammonia is necessary for the selective catalytic reduction taking place at the SCR catalytic converter device 14 positioned farther downstream. To improve the ammonia yield, the isocyanic acid is reacted in a catalytically induced hydrolysis reaction with the previously evaporated water to form ammonia. To induce this hydrolysis reaction, a respective catalyst coating 20, 22, which provides a hydrolysis catalyst, is provided in the exhaust system 10 in the example shown on the inner circumferential surface of the pipe 12 and on the mixer 18.

The catalyst coating 20, 22 applied to the pipe 12 and the mixer 18 comprises two material layers each. A basic material layer 24, 26 applied to the surface of the pipe 12 or mixer 18, which surface is to be coated, is provided for achieving a good adhesive effect of the catalyst coating 20, 22 on the components pipe 12 and mixer 18, which components consist, in general, of a metallic material and form respective exhaust gas-carrying components of the exhaust system 10. A respective, catalytically active material layer 28, 30 is applied to the basic material layer 24, 26. The catalytically active material layer 28, 30 preferably covers the basic material layer 24, 26 essentially completely and provides a catalytically active surface, which comes into contact with the reactant R injected through the reactant release device 16 and with the components of said reactant, which are generated by evaporation or thermolysis. For example, the catalyst coating 20 provided on the pipe 12 may be positioned here such that it is guaranteed that essentially no reactant R released in the form of the spray cone will come into contact with a surface area of the pipe 12, which surface area is positioned farther upstream and is not covered with the catalyst coating.

To achieve the above-mentioned good adhesive effect for the basic material layer 24, 26 in the exhaust system 10 configured and manufactured according to the present invention, the surface of the pipe 12 or of the mixer 18, which surface is to be coated, can first be cleaned, especially degreased and treated, for example, by sandblasting to increase the surface roughness in a preparatory work step.

The basic material layer 24, 26 is then applied to the thus prepared surface area of the pipe 12 or mixer 18. The basic material layer 24, 26 advantageously consists of a ceramic material, e.g., titanium dioxide ($TiO_2$). According to the principles of the present invention, the material layer made of ceramic material is applied in a high-temperature application process, which may be defined, for example, by the material to be applied in such a high-temperature application process reaching a temperature of at least 1,000° C. in at least some areas in order to melt this material in at least some areas. The basic material layer 24, 26 consisting of titanium dioxide may be applied, for example, in a flame spraying process or in a plasma spraying process, while a process temperature of up to and above 3,000° C. is reached and the melting point of titanium dioxide, equaling approximately 1,800° C., is thus markedly exceeded. The application of the basic material layer 24, 26 with such a high-temperature application process leads to a very good adhesive interaction between the surface of the component to be coated, i.e., for example, the pipe 12 and the mixer 18, and the material of which the basic material layer 24, 26 consists. It is assumed that the titanium dioxide is formed with a rutile crystalline structure, i.e., a so-called rutile, in case of such an application of titanium dioxide in a high-temperature application process. The process temperature or the temperature of the material of the basic material layer 24, 26 to be applied, which temperature must be reached or exceeded in a high-temperature application process, may consequently also be defined such that the temperature is so high that the material of the basic material layer 24, 26, which material is to be applied, is formed with a crystalline structure guaranteeing good adhesive effect especially to a metallic substrate, as this happens, for example, in the case of rutile when titanium dioxide is used.

The catalytically active material layer is applied to the basic material layer in a subsequent work process in a low-temperature application process. This advantageously also consists of a ceramic material. It is especially advantageous if the same material, i.e., titanium dioxide in the example being described, is used for the catalytically active material layer 28, 30 as for the basic material layer 24, 26. It was found that an especially strong bond can be obtained in this case between the basic material layer 24, 26 and the respective, catalytically active material layer 28, 30 to be prepared thereon.

The application of the catalytically active material layer 28, 30 in a low-temperature application process, e.g., a dipping process or in a spraying process, is characterized according to the principles of the present invention in that temperatures that exceed a temperature range of 500° C. or 600° C. are not generally reached. A dipping process or a spraying process is carried out, in general, at room temperature or at a temperature slightly above room temperature. Such a process for applying the material of the catalytically active material layer 28, 30 may be followed by a heat treatment, during which the above-mentioned temperature in the range of 500° C. to 600° C. is not, however, exceeded. It is consequently possible here to select, for example, an application process that is used to apply catalytically active materials to generally ceramic substrates of catalytic converters.

It may be assumed that when titanium dioxide is used as the material for the catalytically active material layer 28, 30 as well, this is applied with an anatase crystalline structure, i.e., so-called anatase. The anatase crystalline structure is transformed into the rutile crystalline structure at temperatures of 700° C. to 900° C. However, since such a high temperature is not reached in the low-temperature application process, it may be assumed that the catalytically active material layer 28, 30 is produced from titanium dioxide with an anatase crystalline structure or this is preserved. It was found that the catalytically active material layer applied in a low-temperature application process reaches a markedly higher efficiency of the catalytically induced reaction even though the catalytically active material layer consists of the same material as the basic material layer, which can generally be attributed to the fact that the catalytically active material layer produced in the low-temperature application process has a markedly rougher or fissured surface than the basic material layer generated in the high-temperature application process and the catalytically active material layer consequently provides a substantially larger catalytically active surface.

Due to the application of the catalyst coating 20, 22 to exhaust gas-carrying components, i.e., the pipe 12 and the mixer 18, in an area located upstream of the SCR catalytic converter device 14, it is guaranteed that an efficient treatment of the reactant R and hence a higher percentage of ammonia for the selective catalytic reduction to be carried out in the SCR catalytic converter device 14 can already be achieved in this flow area or volume area. It is consequently unnecessary to provide a volume area in the SCR catalytic converter device 14 itself for first carrying out a reaction of the reactant R into ammonia in a catalytic hydrolysis, so that the volume of the SCR catalytic converter device 14, which volume is provided for the selective catalytic reduction, can be utilized more efficiently.

Due to the catalyst coating 20, 22 being provided in an area located upstream of the SCR catalytic converter device 14, especially in the area in which good mixing of the reactant R with the exhaust gas A shall be ensured, byproducts, which may form deposits on exhaust gas-carrying components, are, furthermore, very extensively prevented from forming based on the catalytic hydrolysis reaction, which is carried out efficiently.

As an alternative to the above-described material titanium dioxide, it is also possible to use another ceramic material, e.g., aluminum oxide ($Al_2O_3$), to build up the respective catalyst coating 20 and 22. A basic material layer 24, 26 can also be formed from such a ceramic material at first in a high-temperature application process, for example, in a flame spraying process or in a plasma spraying process. This basic material layer consisting of aluminum oxide, which is applied in a high-temperature application process to the surface of the pipe 12 or of the mixer 18, which surface is optionally pretreated in the above-described manner, also displays an extraordinarily strong adhesive effect on such exhaust gas-carrying components made of a metallic material. It may be assumed that so-called α-aluminum oxide is formed in case of application in a high-temperature application process. The catalytically active material layer 28, 30 is then applied to this basic material layer 24, 26 consisting of α-aluminum oxide in a low-temperature application process, i.e., for example, a dipping process or a spraying process, and it may be assumed that the comparatively porous γ-aluminum oxide is formed, which provides a very large catalytically active surface based on its porosity or roughness, but is, on the other hand, bonded very well to the material forming the basic material layer 24, 26. Since a temperature in the range of 800° C., at which γ-aluminum oxide is transformed into α-aluminum oxide, is not reached or exceeded in the low-temperature application process, and such a temperature also cannot be assumed to be able to be reached during the flowthrough of exhaust gas, the material forming the catalytically active material layer 28, 30, in the case of γ-aluminum oxide, remains in its crystalline structure generated in the low-temperature application process, i.e., in a cubic crystalline structure, which differs fundamentally from the rhombohedral crystalline structure of the α-aluminum oxide.

It should finally be noted that, for example, zirconium oxide (ZrO or $ZrO_2$) may also be used in the above-described manner in two material layers in a high-temperature application process and in a low-temperature application process to provide the catalyst coating 20, 22. Regardless of the particular ceramic material used to prepare the two material layers, a very good adhesive effect is basically ensured for an exhaust gas-carrying component of an exhaust system, which component is made especially of a metallic material, on the one hand, and, on the other hand, an efficient catalytic reaction is ensured on the surface that comes into contact with reactant or components thereof by the multilayer configuration, in which both layers preferably consist basically of the same material and optionally differ in their crystalline structure from one another. It was found that a very good bond of the catalyst coating to the material forming the respective exhaust gas-carrying component can be achieved with such a layered configuration on practically all steel grades, especially the steel grades used to manufacture exhaust gas-carrying components of an exhaust system.

It should further be noted that different materials may be used for the basic material layer, on the one hand, and for the catalytically active material layer, on the other hand, for example, to influence the catalytic action. For example, a catalytically active material layer consisting of titanium dioxide could be applied to a basic material layer consisting of aluminum oxide, because a catalytically highly active coating consisting of titanium dioxide was found to have a very good adhesive effect to a basic material layer consisting of aluminum oxide, which said basic material layer forms strong bond with the metallic material of which an exhaust gas-carrying component consists.

As was described above, such a coating is preferably provided in areas or on components that are located in the flow direction between the reactant release device and the SCR catalytic converter device and come into contact with the injected reactant. Such components may be coated with the multilayer catalyst coating in some areas only or also completely. Further, it is not absolutely necessary to coat all the components that are located in or carrying the exhaust gas stream. For example, it would be possible to coat only the mixer or only the pipe with the catalyst coating.

While specific embodiments of the invention have been shown and described in detail to illustrate the application of the principles of the invention, it will be understood that the invention may be embodied otherwise without departing from such principles.

What is claimed is:

1. A process for manufacturing an exhaust system for an internal combustion engine, the process comprising the steps of:

providing at least one exhaust gas-carrying component for the exhaust system;

applying a titanium dioxide basic material layer to at least one area of a surface of the at least one exhaust gas-carrying component in a high-temperature application process with a process temperature exceeding 1800° C. for providing the titanium dioxide basic material layer with a rutile crystalline structure; and applying a titanium dioxide catalytically active material layer providing a catalytically active surface to the basic material layer in a low-temperature application process with a process temperature not exceeding 600° C. for providing the titanium dioxide catalytically active material layer with an anatase crystalline structure, such that the basic material layer and the catalytically active material layer consisting of the same material have mutually different crystalline structures, and that the catalytically active material layer covers the basic material layer completely.

2. The process in accordance with claim 1, wherein:
said at least one exhaust gas-carrying component is comprised of metallic material; or
said at least one exhaust gas-carrying component comprises a pipe; or
said at least one exhaust gas-carrying component comprises a mixer; or
any combination of said at least one exhaust gas-carrying component is comprised of metallic material, and said at least one exhaust gas-carrying component comprises a pipe; and said at least one exhaust gas-carrying component comprises a mixer.

3. The process in accordance with claim 1, wherein said step of applying a basic material layer comprises applying the basic material layer applied with a flame spraying process or with a plasma spraying process.

4. The process in accordance with claim 1, wherein said step of applying a catalytically active material layer comprises applying the catalytically active material layer in a dipping process or in a spraying process.

5. The process in accordance with claim 1, wherein a temperature of the material to be applied for the basic material layer is so high that the material to be applied is melted in at least some areas in the high-temperature application process.

6. The process in accordance with claim 1, wherein said step of providing at least one exhaust gas-carrying component for the exhaust system comprises:
degreasing said at least one area of the surface to be coated in said step of applying a basic material layer; or
increasing a surface roughness of said at least one area of the surface to be coated in said step of applying a basic material layer; or
degreasing said at least one area of the surface to be coated in said step of applying a basic material layer and increasing a surface roughness of said at least one area of the surface to be coated in said step of applying a basic material layer.

7. The process in accordance with claim 1, wherein:
the at least one component coated with the basic material layer and coated with the catalytically active material layer is assembled with additional exhaust system components; and
upon assembling the at least one component, coated with the basic material layer and coated with the catalytically active material layer, with the additional exhaust system components, the at least one component is positioned downstream of a reactant release device and the at least one component is positioned upstream of an SCR catalytic converter device.

8. A process for manufacturing an exhaust system for an internal combustion engine, the process comprising the steps of:

providing at least one exhaust gas-carrying component for the exhaust system;

applying a titanium dioxide basic material layer to at least one area of a surface of the at least one exhaust gas-carrying component in a process with a process temperature greater than 1800° C. for providing the titanium dioxide basic material layer with a rutile crystalline structure; and applying a titanium dioxide catalytically active material layer providing a catalytically active surface to the basic material layer in a low-temperature application process with a process temperature equal to or less than 600° C. for providing the titanium dioxide catalytically active material layer with an anatase crystalline structure after applying the titanium dioxide basic material layer to the at least one area of the surface of the at least one exhaust gas-carrying component, wherein the basic material layer and the catalytically active material layer have mutually different crystalline structures, the catalytically active material layer completely covering the basic material layer.

9. The process in accordance with claim 8, wherein:

said at least one exhaust gas-carrying component is comprised of metallic material; or said at least one exhaust gas-carrying component comprises a pipe; or said at least one exhaust gas-carrying component comprises a mixer; or any combination of said at least one exhaust gas-carrying component is comprised of metallic material, and said at least one exhaust gas-carrying component comprises a pipe; and said at least one exhaust gas-carrying component comprises a mixer.

10. The process in accordance with claim 8, wherein said step of applying a basic material layer comprises applying the basic material layer applied with a flame spraying process or with a plasma spraying process.

11. The process in accordance with claim 8, wherein said step of applying a catalytically active material layer comprises applying the catalytically active material layer in a dipping process or in a spraying process.

12. The process in accordance with claim 8, wherein a temperature of the material to be applied for the basic material layer is so high that the material to be applied is melted in at least some areas in the high-temperature application process.

13. The process in accordance with claim 8, wherein said step of providing at least one exhaust gas-carrying component for the exhaust system comprises:

degreasing said at least one area of the surface to be coated in said step of applying a basic material layer; or increasing a surface roughness of said at least one area of the surface to be coated in said step of applying a basic material layer; or degreasing said at least one area of the surface to be coated in said step of applying a basic material layer and increasing a surface roughness of said at least one area of the surface to be coated in said step of applying a basic material layer.

14. The process in accordance with claim 8, wherein:

the at least one component coated with the basic material layer and coated with the catalytically active material layer is assembled with additional exhaust system components; and upon assembling the at least one component, coated with the basic material layer and coated with the catalytically active material layer, with the additional exhaust system components, the at least one component is positioned downstream of a reactant release device and the at least one component is positioned upstream of an SCR catalytic converter device.

\* \* \* \* \*